(12) United States Patent
Zhang et al.

(10) Patent No.: US 8,190,538 B2
(45) Date of Patent: May 29, 2012

(54) METHODS AND SYSTEMS FOR MATCHING RECORDS AND NORMALIZING NAMES

(75) Inventors: Ling Qin Zhang, Springboro, OH (US); Mark Wasson, Seattle, WA (US); Valentina Templar, Las Vegas, NV (US)

(73) Assignee: LexisNexis Group, Miamisburg, OH (US)

( * ) Notice: Subject to any disclaimer, the term of this patent is extended or adjusted under 35 U.S.C. 154(b) by 662 days.

(21) Appl. No.: 12/363,057

(22) Filed: Jan. 30, 2009

(65) Prior Publication Data

US 2010/0198756 A1   Aug. 5, 2010

(51) Int. Cl.
G06F 15/18 (2006.01)
(52) U.S. Cl. ........................................................ 706/12
(58) Field of Classification Search ..................... 706/12
See application file for complete search history.

(56) References Cited

U.S. PATENT DOCUMENTS

| | | | |
|---|---|---|---|
| 5,585,793 A | 12/1996 | Antoshenkov et al. | |
| 5,768,603 A | 6/1998 | Brown et al. | |
| 6,393,389 B1 | 5/2002 | Chanod et al. | |
| 6,816,830 B1 | 11/2004 | Kempe | |
| 7,912,705 B2 * | 3/2011 | Wasson et al. | 704/9 |
| 2003/0135826 A1 | 7/2003 | Dozier | |
| 2005/0080614 A1 | 4/2005 | Bennett | |
| 2005/0108630 A1 | 5/2005 | Wasson et al. | |
| 2005/0192792 A1 * | 9/2005 | Carus et al. | 704/2 |

OTHER PUBLICATIONS

Dunn, "Record Linkage," American Journal of Public Health, vol. 36, 1412-1416 (1946).
Newcombe et al., "Automatic Linkage of Vital Records," Science, vol. 130, 954-959 (1959).
Fellegi et al., "A Theory for Record Linkage," Journal of the American Statistical Association, Dec. 1969, vol. 64, No. 328, pp. 1183-1210.
Newcombe et al., "Record Linkage: Making Maximum Use of the Discriminating Power of Identifying Information," Communications of the ACM, 1962, vol. 5, Issue 11, pp. 563-566.
Dozer et al., "Automatic Extraction and Linking of Person Names in Legal Text," RIAO-2000 Proceedings.
Friedman et al., "Additive Logistic Regression: a Statistical View of Boosting," Annals of Statistics, 38(2):337-374 (2000).
Cohen et al., "A Comparison of String Distance Metrics for Name-Matching Tasks," International Joined Conference in Artificial Intelligence, 2003.
Zhang et al., "HMM and Rule Based Law Firm Name Normalization for Optimized Comparison Design," Submitted to Knowledge Discovery and Data Mining (KDD) 2008.

(Continued)

*Primary Examiner* — Michael B Holmes
(74) *Attorney, Agent, or Firm* — Finnegan, Henderson, Farabow, Garrett & Dunner, LLP

(57) ABSTRACT

Methods and systems are provided for normalizing strings and for matching records. In one implementation, a string is tokenized into components. Sequences of tags are generated by assigning tags to the components. A sequence of states is determined based on the sequences of tags. A normalized string is generated by normalizing the sequence of the states. A key record including key fields is extracted from a first data source. A candidate record including candidate fields is extracted from a second data source. A numerical record including numerical fields is computed by comparing the key fields and the candidate fields using comparison functions. Matching functions determined by an additive logistic regression method are applied to the numerical fields. Whether the key record and the candidate record are a match is determined based on a sum of results of the matching functions.

42 Claims, 10 Drawing Sheets

OTHER PUBLICATIONS

Rennie, "Boosting with Decision Stumps and Binary Features," Apr. 10, 2003.

Schapire, "The Boosting Approach to Machine Learning: An Overview," MSRI Workshop on Nonlinear Estimation and Classification, 2003.

Bouchaert, "Choosing Between Two Learning Algorithms Based on Calibrated Tests," Proceedings of the Twentieth International Conference on Machine Learning (ICML-2003), Washington, DC, 2003.

Cochinwala et al. "Record Matching: Past, Present and Future," Mar. 19, 2001, Submitted to ACM Computing Surveys, 2003.

Winkler, "Matching and Record Linkage," in B. G. Cox et al. (ed.), Business Survey Methods, New York: J. Wiley, 355-384 (1995).

Winkler, "Advanced Methods for Record Linkage," American Statistical Association, Proceedings of the Section on Survey Research Methods, pp. 467-472 (1995).

Hersh et al., "Assessing Thesaurus-Based Query Expansion Using the UMLS Metathesaurus," Proceeding of AMIA Symposium, 334-8 (2000).

Rahm et al., "Data Cleaning: Problems and Current Approaches," IEEE Bulletin of the Technical Committee on Data Engineering, vol. 23, No. 4, Dec. 2000.

Allburn et al., "Customer Data Integration, Linkage Precision and Match Accuracy," Data Ming Review, Nov. 2004.

Monge et al., "The Field Matching Problem: Algorithms and Applications," Knowledge Discovery and Data Mining 1996.

Christen et al., "Probabilistic Name and Address Cleaning and Standardisation," The Australasian Data Mining Workshop 2002.

Churches et al., "Preparation of Name and Address Data for Record Linkage Using Hidden Markov Models," BMC Medical Informatics and Decision Making 2002, 2:9.

Winkler, "String Comparator Metrics and Enhanced Decision Rules in the Fellegi-Sunter Model of Record Linkage," Proceedings of the Section on Survey Research Methods, American Statistical Association, 354-359, 1990.

Porter et al., "Approximate String Comparison and its Effect on an Advanced Record Linkage System," U.S. Bureau of the Census, Research Report, 1997.

Rabiner, "A Tutorial on Hidden Markov Models and Selected Applications in Speech Recognition," Proceedings of the IEEE, vol. 77, No. 2, pp. 257-286, Feb. 1989.

Borkar et al., "Automatic Segmentation of Text into Structured Records," ACM SIGMOD May 21-24, 2001.

Juang et al., "Hidden Markov Models for Speech Recognition," Technometrics, vol. 33, No. 3, Aug. 1991, 251-272.

Petrushin, "Hidden Markov Models: Fundamentals and Applications," Online Symposium for Electronics Engineer, 2000.

Forney, "The Viberti Algorithm," Proceedings of the IEEE, vol. 61, No. 3, pp. 268-278 (Mar. 1973).

Conrad et al., "Linking, Mapping, and Clustering Entity Records in Information-Based Solutions for Business and Professional Customers," Language Resources and Evaluation (LREC) 2008.

Veeramachaneni et al., "Surrogate Learning—an Approach for Semi-Supervised Classification," CoRR abs/0809.4632, Submitted to International Conference on Machine Learning (ICML) 2008 (Anonymous Author version).

International Search Report and Written Opinion, mailed May 19, 2010, for PCT/US2010/020982 (11 pages).

\* cited by examiner

METHODS AND SYSTEMS FOR MATCHING RECORDS AND NORMALIZING NAMES

BACKGROUND

1. Technical Field

The present disclosure generally relates to record linkage techniques for identifying same entities in multiple information sources. More particularly, and without limitation, the present disclosure relates to methods and systems for normalizing names and matching records.

2. Background Information

Vast amounts of information are stored in heterogeneous distributed sources. For example, LexisNexis stores large and diverse content including non-structured data such as text-based news articles and legal cases, and structured data such as public records and attorney and judge attorney directories. Therefore, records (e.g., of organizations, persons, and addresses) that pertain to the same entity may be stored in various forms. These variations of the same entities pose a problem when comparing names or linking records, because an entity that has its name stored in two different forms may be determined as being two different entities when its varying names are compared or when its varying records are linked.

For example, law firm names vary greatly in format. For example, some law firm names include last names of partner attorneys, such as "Finnegan, Henderson, Farabow, Garrett & Dunner, L.L.P." Other law firm names do not include any last names but may include an area of specialty such as "The Injury Lawyers, P.C." In addition, various different forms of the same law firm name may be used in different contexts. Often, long law firm names are shortened for convenience. For example, "Law Office of Smith, Johnson & Miller" may be shortened to "Law Office of Smith et al.", and "Finnegan, Henderson, Farabow, Garrett & Dunner, L.L.P." may be referred to as just "Finnegan." Also, a law firm name that includes a middle initial of an attorney such as "John D. Smith, Attorney at Law" may be referenced without the middle initial "D."

Due to the vast amounts of information distributed across multiple sources, there is a need and desire to resolve entity relationships and integrate distributed information together so that related information can be easily packaged and presented together. For example, in the context of legal information, an attorney's professional identification presented in a case law document may be linked with the attorney's entry in a structured authority directory that includes the attorney's biographical and employer information.

To resolve entity relationships and integrate distributed information, there is a need to develop a record matching method. Using a probabilistic classifier, such as a naive Bayes classifier, to match records may result in undesirable levels of precision error and recall error. Accordingly, there is a need for methods and systems that match records with high precision and recall.

Furthermore, in support of record matching, normalization may be necessary before the matching process begins for improved comparison results. Past normalization techniques have included pure rule-based approaches and pure probability-based approaches, which may be less effective than combined approaches.

In view of the foregoing, there is a need for improved methods and systems for matching records, and methods and systems for normalizing names.

SUMMARY

Disclosed embodiments relate to methods and systems for normalizing names and matching records. Pursuant to certain embodiments, methods and systems are provided for normalizing names in preparation for comparing names, and for matching records from one source to records from another source. For example, disclosed methods and systems provide normalized law firm names for comparing law firm names and match attorney records from a legal document to attorney records from an attorney directory.

In accordance with one embodiment, a computer-implemented method is provided that normalizes strings. The method comprises tokenizing a string into a sequence of components. The method further comprises generating one or more sequences of tags by assigning tags to the components based on lookup tables. The method further comprises determining, using a processor, a sequence of states of the components based on the one or more sequences of tags. The method further comprises generating a normalized string by normalizing the sequence of the states.

In accordance with one embodiment, a system is provided for normalizing strings. The system comprises a processor. The system further comprises means for tokenizing a string into a sequence of components. The system further comprises means for generating one or more sequences of tags by assigning tags to the components based on lookup tables. The system further comprises means for determining a sequence of states of the components based on the one or more sequences of tags. The system further comprises means for generating a normalized string by normalizing the sequence of the states.

In accordance with one embodiment, a computer-readable storage medium is provided that includes instructions which, when executed by a processor, perform a method of normalizing strings. The method comprises tokenizing a string into a sequence of components. The method further comprises generating one or more sequences of tags by assigning tags to the components based on lookup tables. The method further comprises determining a sequence of states of the components based on the one or more sequences of tags. The method further comprises generating a normalized string by normalizing the sequence of the states.

In accordance with one embodiment, a computer-implemented method is provided that matches records. The method comprises extracting a key record including key fields from a first data source. The method further comprises retrieving a candidate record including candidate fields from a second data source. The candidate fields correspond to the key fields. The method further comprises computing, using a processor, a numerical record including numerical fields by comparing the key fields and the candidate fields using comparison functions. The numerical fields are result values of the comparison functions. The method further comprises applying matching functions to the numerical fields. The matching functions are determined by additive logistic regression. The method further comprises determining whether the key record and the candidate record are a match based on a sum of results of the matching functions.

In accordance with one embodiment, a system is provided for matching records. The system comprises a processor. The system further comprises means for extracting a key record including key fields from a first data source. The system further comprises means for retrieving a candidate record including candidate fields from a second data source. The candidate fields correspond to the key fields. The system further comprises means for computing a numerical record including numerical fields by comparing the key fields and the candidate fields using comparison functions. The numerical fields are result values of the comparison functions. The system further comprises means for applying matching functions to the numerical fields. The matching functions are determined by additive logistic regression. The system further comprises means for determining whether the key record and the candidate record are a match based on a sum of results of the matching functions.

In accordance with one embodiment, a computer-readable storage medium is provided that includes instructions which, when executed by a processor, perform a method of matching records. The method comprises extracting a key record including key fields from a first data source. The method further comprises retrieving a candidate record including candidate fields from a second data source. The candidate fields correspond to the key fields. The method further comprises computing a numerical record including numerical fields by comparing the key fields and the candidate fields using comparison functions. The numerical fields are result values of the comparison functions. The method further comprises applying matching functions to the numerical fields. The matching functions are determined by additive logistic regression. The method further comprises determining whether the key record and the candidate record are a match based on a sum of results of the matching functions.

It is to be understood that both the foregoing general description and the following detailed description are exemplary and explanatory only, and are not restrictive of the embodiments thereof, as claimed. Furthermore, features and variations may be provided in addition to those set forth herein. For example, embodiments may be directed to various combinations and sub-combinations of the features described in the detailed description.

BRIEF DESCRIPTION OF THE DRAWINGS

The accompanying drawings, which are incorporated in and constitute a part of this specification, illustrate various disclosed embodiments. In the drawings.

DETAILED DESCRIPTION

Figure 1:
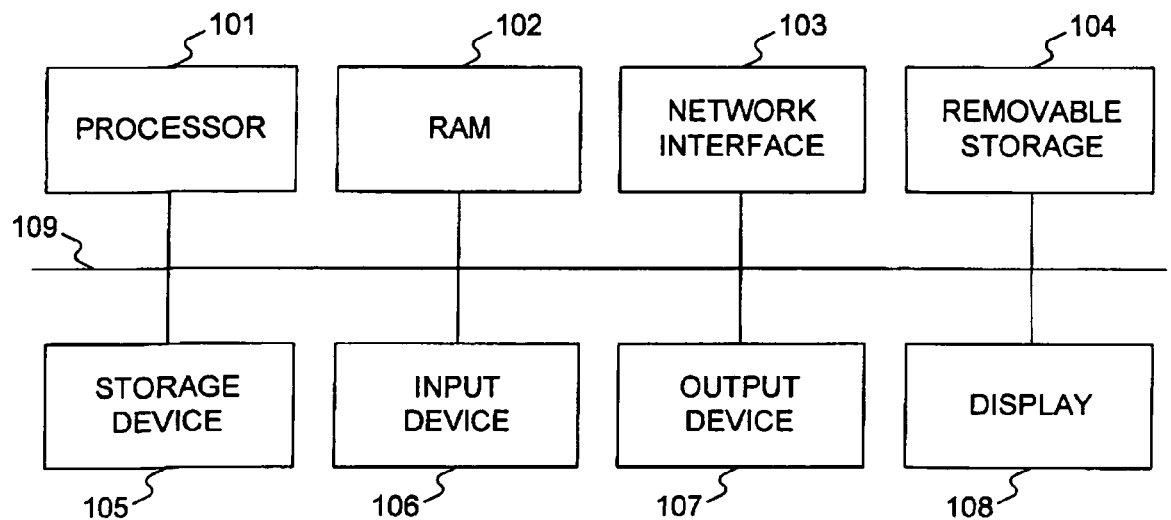
FIG. 1 illustrates an exemplary computer system, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations, and other implementations are possible. For example, substitutions, additions, or modifications may be made to the components illustrated in the drawings, and the exemplary methods described herein may be modified by substituting, reordering, or adding steps to the disclosed methods. Accordingly, the following detailed description is not limiting of the disclosed embodiments. Instead, the proper scope is defined by the appended claims.

Methods and systems for normalizing names and for matching records will be described with respect to law firm names and attorney records, but one of ordinary skill in the art will recognize that these are examples and the disclosed methods and systems can apply to any strings or any records, such as people names, addresses, customer records in a company database, etc.

A record is information or data on a particular subject that can be collected and/or stored. For example, an attorney record is information regarding an attorney. A record may be stored in a database in an electronic form. A record may represent an entity, such as a person, a corporation, a place, etc. A record may contain one or more fields. A field is an element of a record in which one piece of information is stored. For example, an attorney record may contain a name field and an address field.

Exemplary System Implementation of Record Matching and Name Normalization

FIG. 1 illustrates an exemplary computer system 100, consistent with a disclosed embodiment. Computer system 100 may be utilized for implementing exemplary systems and methods for normalizing names and for matching records.

In the example of FIG. 1, computer system 100 includes a processor 101 for executing instructions to perform processes related to normalizing names and matching records, consistent with the disclosed embodiments. Processor 101 may be connected to a data bus 109, which connects various components of computer system 100. Computer system 100 may include a storage device 105 for storing data related to name normalization and record matching. RAM 102 memory may be used by processor 101 as a placeholder for active data during the execution of instructions. Computer system 100 may also comprise one or more input devices 106, for example, a keyboard and a mouse. A network interface 103 may allow computer system 100 to be connected to a network such as intranet, extranet, local area network (LAN), wide area network (WAN), or the Internet. Computer system 100 may comprise a removable storage 104 such as a floppy drive, CD-ROM, DVD-ROM, and USB flash drive. Computer system 100 may also comprise a display 108, such as a monitor, and an output device 107, such as a printer or a fax machine. Program instructions for executing methods and implementing systems for normalizing names and matching records may be stored in storage device 105 or removable storage 104, or may be received via network interface 103. These program instructions may be executed by processor 101.

Record Matching Technique

Exemplary methods of record matching will be described with respect to attorney records, but the below described processes can be applied to any records.

Figure 2:
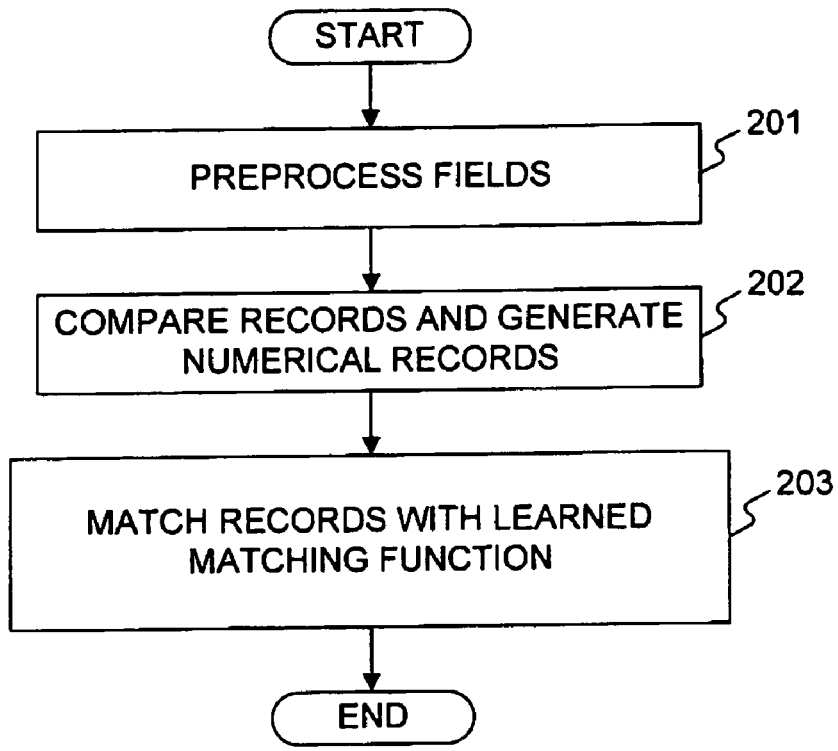
FIG. 2 is a flow chart of an exemplary method for matching records, consistent with a disclosed embodiment.

FIG. 2 is a flow chart of an exemplary method 200 for matching records, consistent with a disclosed embodiment. The following exemplary method includes matching an attorney from a case law document with the attorney in an authority attorney directory database.

The method 200 for matching records applies a supervised learning method, for example, additive logistic regression, to match records stored in two different data sources. An exemplary system for executing method 200 may include four components: record preprocessing, record comparison, record matching, and determining a matching function/classifier through a learning process from training data that is labeled in advance.

In step 201, one or more fields of records are preprocessed by computer system 100. For example, for attorney records, a field storing variant law firm name is normalized into a standard format using a name normalization method, discussed below.

In step 202, a normalized record from one data source is compared by computer system 100 with another record from another data source by using a set of comparison functions, discussed below. As a result of the comparison of records, numerical records are generated. Numerical records may be represented in $R^n$ space, where each dimension represents a comparison value from a corresponding feature of the two records.

In step 203, computer system 100 fits the numerical records into matching functions that are learned with a boosting method, such as additive logistic regression, with base machine learning method, such as a decision stump, from a training data set.

Hidden Markov Model (HMM) for Name Normalization

Exemplary methods of name normalization will be described with respect to law firm names, but the below described processes can be applied to any names or strings. A string may be a combination of alphanumeric characters and may include punctuations, symbols, and special characters.

Hidden Markov Model (HMM) is used for sequence-based pattern recognition such as information extraction. Unlike a rule-based approach that requires a tedious analysis to generate and maintain rules, HMM can dynamically handle unexpected input pattern sequences based on the probability distribution.

The methods and systems for normalizing names apply HMM and predefined lexicons to recognize a particular component of a law firm name and then transform a part of the component into a predefined standard format.

A HMM is a probabilistic finite state machine with a general form in five-tuples $\mu=<S, V, \Pi, A, B>$, which includes a set of states $S=(s_1, s_2, \ldots, s_N)$, and the state is denoted by $S(t)$ for time t; a set of visible symbols $V=(v_1, v_2, \ldots, v_M)$, which is emitted at states; $\Pi=(\pi_i)$ defining the probability of initial states; a transition probability matrix $A=(a_{ij})$, where $a_{ij}=\text{Prob}(S(t+1)|S(t))$ and $$\sum_j a_{ij} = 1$$

for all i; and a symbol emission matrix $B=(b_{ki})$, where $b_{ki}=\text{Prob}(v_k|s_i)$ and $$\sum_k b_{ki} = 1$$

for all i.

Each probability in the state transition matrix and in the symbol matrix is time independent, that is, the matrices do not change in time as the system evolves.

With the HMM method, the set states are defined by analysis of data set such as law firm names. Three matrices are learned from a training data set, as explained below.

In the example of law firm names, a law firm name may consist of a combination of up to six component type categories: People, Initial, Organization, Specialty, Suffix, and Separator. The People component type may include names such as "Smith" and "Johnson." The Initial component type may include a person's initials. The Organization component type may include descriptions that identify the organization such as "Law Office," "Attorney at Law," and "Lawyer Group." The Specialty component type may include an identifier of occupational specialties such as "Accident Lawyers," "Estate Law," "Tax," "Immigration," and "Victims." The Suffix component type may include suffixes that usually appear near or at the end of law firm names such as "P.C.", "& Company", and "L.L.P." The Separator component type may include functional words or punctuations such as "the", "of", "and", "&", comma, and "et al." The Separator component type may be used to identify boundaries between the other five components but may not be used in comparing records. Other types of components may be defined based on the type of string that is being normalized. For example, when normalizing postal addresses, a different set of component types may be defined, such as street number, cardinal direction, street name, apartment number, city, state, zip code, county, country, etc.

In one embodiment, a law firm name may consist of a sequence of words that belong to six component types. Component tables may be predefined as lookup tables in support of HMM process for state recognition and labeling. The component tables include lists of instances of components. Component lookup tables may contain words, phrases, or symbols that fall into each component type category. In the example of law firm names, Tables 1-4 below are examples of lookup tables for Organization, Specialty, Suffix, and Separator component types, respectively. In support of normalization, a component lookup table may include normal formats, for example, Tables 1 and 3.

TABLE 1

Organization Component Lookup Table.

| LOOKUP | NORMAL |
|---|---|
| ADVOCATE | ADVOC |
| ARBITRATION OFFICES | ARB |
| APPELLATE ASSOCIATES | ASSOCIATE |
| ATTORNEY AT LAW | ATTY |
| & ASSOC | ASSOC |
| TRIAL LAWYERS | LAWYERS |
| LAW OFFICES | OFFICE |
| LAW OFFICE | OFFICE |
| LAWYER GROUP | GROUP |

TABLE 2

Specialty Component Lookup Table.
LOOKUP

AVIATION LAW
ACCIDENT
ADMIRALTY LAW
ARRESTED
BANK
CIVIL RIGHTS
COMPENSATION
DRUNKEN DRIVING
EDUCATION

TABLE 2-continued

Specialty Component Lookup Table.

| LOOKUP |
| --- |
| ELDER |
| ESTATE LAW |
| FARM LAW |
| RIGHTS |
| TAX |
| TECHNOLOGY |
| VICTIMS |

TABLE 3

Suffix Component Lookup Table.

| LOOKUP | NORMAL |
| --- | --- |
| CHTD | CHT |
| & COMPANY | CO |
| CORPORATION | CORP |
| A LAW CORPORATION | LC |
| LLC | LLC |
| PROFESSIONAL ASSOCIATION | PA |
| PROFESSIONAL LIMITED CO | PLC |
| APLLC | PLLC |
| SERVICE CORP | SC |

TABLE 4

Separator Component Lookup Table.

| LOOKUP |
| --- |
| - |
| & |
| ( |
| ) |
| / |
| AND |
| OF |
| THE |

HMM Transition States Design

In one embodiment, six states may be defined as People, Initial, Organization, Specialty, Suffix, and Separator. These states may represent the hidden states in the hidden Markov model.

Because each of the tokens of a law firm name belongs to one of the six component types, six transition states are defined based on the six components types, which are People, Initial, Organization, Specialty, Suffix, and Separator, plus one Start state. The transition states may be represented as a state vector S=(People, Initial, Organization, Specialty, Suffix, Separator, Start).

Figure 3:
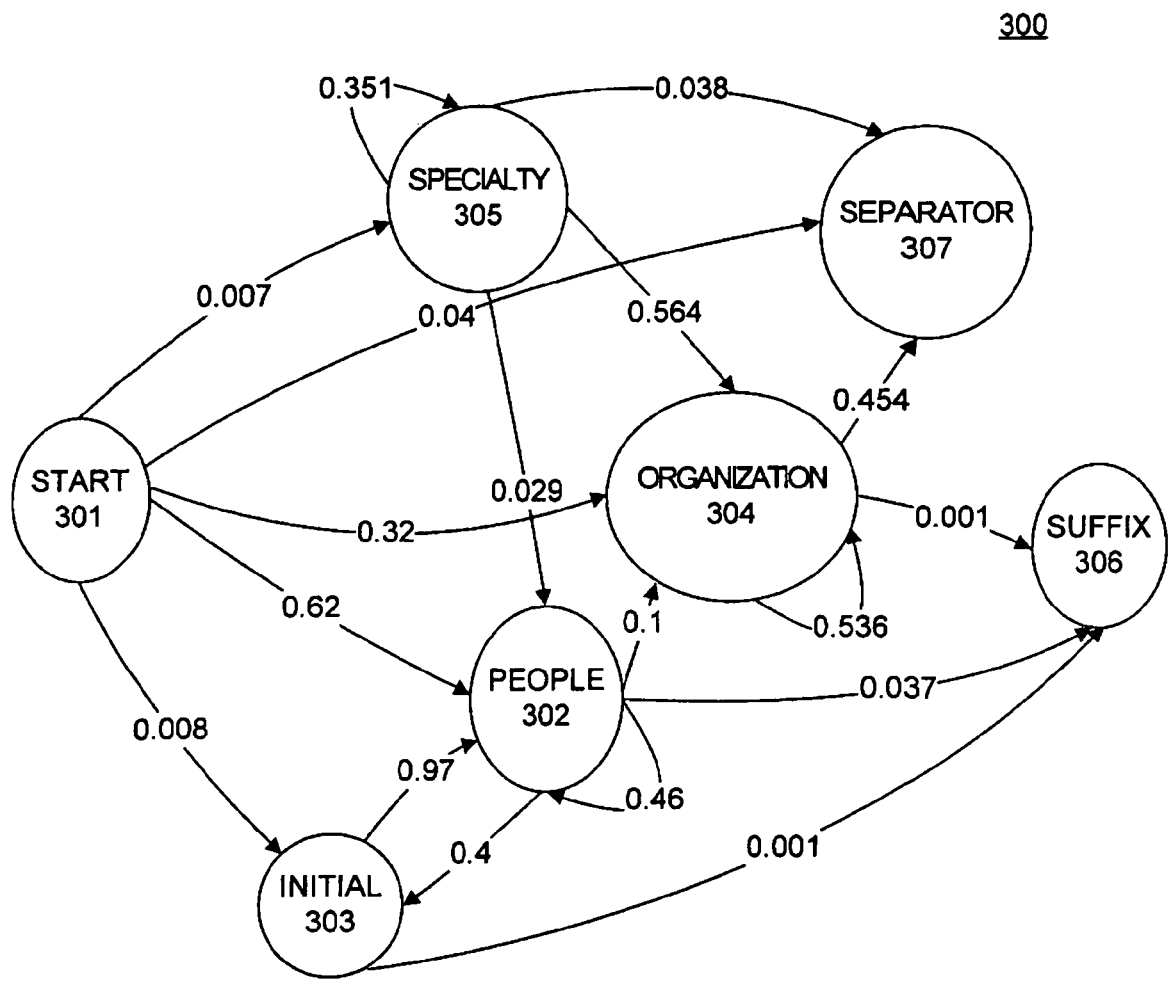
FIG. 3 is an exemplary state transition diagram of a hidden Markov model, consistent with a disclosed embodiment.

FIG. 3 is an exemplary state transition diagram 300 of the hidden Markov model, consistent with a disclosed embodiment. State transition diagram 300 may include a start state 301, a people state 302, an initial state 303, an organization state 304, a specialty state 305, a suffix state 306, and a separator state 307. State transition diagram 300 may further include arrows from one state to another state marked with a number indicating the probability of transition from one state to another state. For example, the probability of transition from people state 302 to suffix state 306 is 0.037. Some arrows start and end at the same state indicating a transition from and to the same state. For example, the probability of transition from organization state 304 to organization state 304 is 0.536. Arrows leading away from start state 301 indicate the initial probability of each state to which the arrows lead. For example, the initial probability of specialty state is 0.007. A lack of an arrow from one state to another (or from one state to the same state) indicates zero probability of such a transition. For example, the probability of transition from suffix state 306 to separator state 307 is 0. State transition diagram 300 may be generated by processor 101 based on the state transition probability matrix and stored in storage device 105.

Tag Tables and HMM Emission Symbols

Generally, in HMM process, the real states are hidden, and the recognition process uses observed symbols to find the hidden states. Such observed signals are called emission symbols. In the example of law firm names, each token of a law firm name can be considered as an emission symbol on a state, which is observed as tags. A token may be assigned more than one tag. Table 5 below is an example of a tag table.

TABLE 5

Tag Table.

| TOKEN | TAG |
| --- | --- |
| & | SEP |
| / | SEP |
| ACCIDENT | SPE |
| ADVISERS | ORG |
| AND | SEP |
| ATTORNEY | ORG, SPE |
| CO | ORG, SUX |
| IMMIGRATION | SPE |
| LAWYER | ORG |
| LAW | ORG, SPE |
| OFFICES | ORG |
| YOUTH | SPE |

Because some tokens can be classified under multiple component types, a tag table may have multiple tags for the same token. For example, "LAW" may indicate an organization when used as "Law Offices" but may also indicate a specialty when used as "Immigration Law."

In one embodiment, the states and the tags may be provided to computer system 100. Alternatively, computer system 100 may define the states and the tags based on the component types. The component types, the states, and the tags may be stored in storage device 105.

HMM Probability Matrix

In the example of law firm names, given transition states and emission symbols design, three probability matrices may be defined as below:

Initial State Probability Matrix $\Pi=(\pi_1, \pi_2, \pi_3, \pi_4, \pi_5, \pi_6)$, where $\pi_i$ is the probably from Start state to other states as shown in Table 6 below:

TABLE 6

| | People | Initial | Organization | Specialty | Suffix | Separator |
| --- | --- | --- | --- | --- | --- | --- |
| Start | $\pi_1$ | $\pi_2$ | $\pi_3$ | $\pi_4$ | $\pi_5$ | $\pi_6$ |

State Transition Probability Matrix $A=(P_{ij})$, where $P_{ij}$ is the probability from state i to state j, where i=1 . . . 6 and j=1 . . . 6.

Emission Symbols Probability Matrix $B=(b_{ki})$, where $b_{ki}$ is the probability of tag k appearing on state i, where i=1 . . . 6 and k=1 . . . 6.

In order to use HMM to recognize the components, a training component is used to learn the above three matrices, as described below.

Components of Normalization Process

A law firm name can be viewed as a sequence of input tokens, where each token is one of the component types, which are hidden states. The hidden states can be recognized with the observed token tags.

Figure 4:
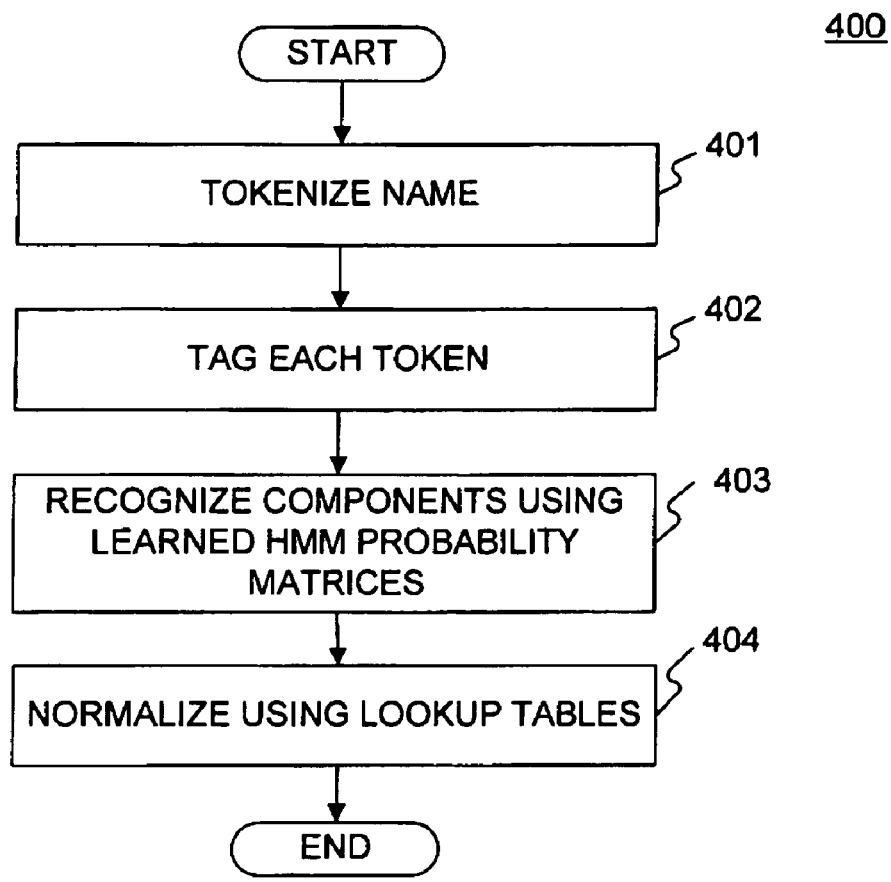
FIG. 4 is a flow chart of an exemplary method for recognizing name components and normalizing names, consistent with a disclosed embodiment.

FIG. 4 is a flow chart of an exemplary method 400 for recognizing name components and normalizing names, consistent with a disclosed embodiment.

In step 401, a name is tokenized by computer system 100 into component tokens. For example, a law firm name "The law offices of Smith & Johnson, LLC" may be capitalized and tokenized into a sequence of tokens "THE" "LAW" "OFFICES" "OF" "SMITH" "&" "JOHNSON" "," "LLC".

In step 402, each token in the sequence is assigned corresponding tag or tags based on the tag table by computer system 100 to generate sequences of tags. Since the tag table includes tags for only four out of six possible tags, the two remaining tags, namely PNP and INI, may be determined by a set of rules. For example, any token that has not been tagged after using the tag table may be tagged with INI if the token has only one character or PNP if the token has multiple characters. Following the example above, tagging the sequence of tokens "THE" "LAW" "OFFICES" "OF" "SMITH" "&" "JOHNSON" "," "LLC" may generate three tag sequences as follows:

(SEP, ORG, ORG, SEP, PNP, SEP, PNP, SEP, SUX)
(SEP, SPE, ORG, SEP, PNP, SEP, PNP, SEP, SUX)
(SEP, SUX, ORG, SEP, PNP, SEP, PNP, SEP, SUX)

In this example, the tagging step produced three possible tag sequences because the token "LAW" (the second token) could potentially be an organization, specialty, or suffix component type.

In step 403, the Viterbi algorithm may be applied to the list of potential tag sequences and the hidden Markov model matrices by computer system 100 to determine the most probable tag sequence. In this example, the Viterbi algorithm is used to recursively find the most possible state path for each observed sequence, i.e., (SEP, ORG, ORG, SEP, PNP, SEP, PNP, SEP, SUX), and the final state path is the one that results in the highest probability among all state paths. Therefore, the hidden states of "The law offices of Smith & Johnson, LLC" is (Separator, Organization, Organization, Separator, People, Separator, People, Separator, Suffix).

In step 404, computer system 100 may generate a normalized form of the name. This step involves first removing any Separator states, because these are not used for record matching. Following the above example, removing the Separator states would result in (Organization, Organization, People, People, Suffix). Then, same states in sequence may be combined as one. For example, the two consecutive Organization states and the two consecutive People states may be combined to result in the following:

Organization: LAW OFFICES
People: SMITH JOHNSON
Suffix: LLC.

Next, the resulting states are normalized using one or more lookup tables that include normalized forms. In this example, "LAW OFFICES" is included in Table 1 and its normal form is "OFFICE." Furthermore, "LLC" is included in Table 3 and its normal form is "LLC." Therefore, the normalized law firm name is:

Organization: OFFICE
People: SMITH JOHNSON
Suffix: LLC.

The above steps 401 through 404 described an exemplary process of normalizing names.

Technique to Learn HMM Probability Matrices from Corpus of Law Firm Names

Figure 5:
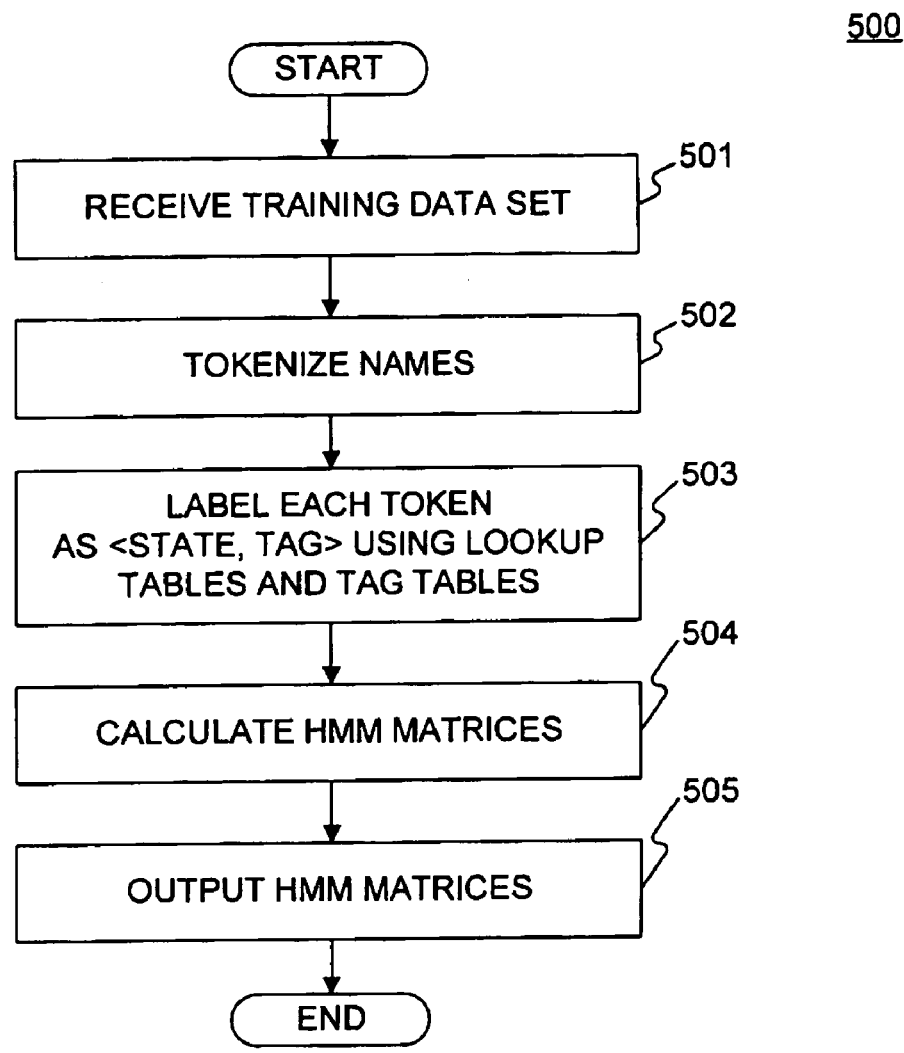
FIG. 5 is a flow chart of an exemplary method for training a hidden Markov model for normalizing names, consistent with a disclosed embodiment.

FIG. 5 is a flow chart of an exemplary method 500 for training a hidden Markov model for normalizing names, consistent with a disclosed embodiment.

In step 501, computer system 100 receives a training data set of law firm names. The training data set is transferred from a database containing law firm names, for example, an authority attorney directory database such as the LexisNexis Martindale-Hubbell® directory, to computer system 100 through a network via network interface 103. The authority attorney directory database contains a directory of attorneys and corresponding information such as addresses, positions, law firms, law schools, etc. Alternatively, the training data set may be inputted by a user through input device 106 or provided to computer system 100 by a user on removable storage 104. The training data set may be stored in storage device 405.

In step 502, law firm names in the training data set are tokenized into component tokens by computer system 100. For example, a law firm name "The law offices of Smith & Johnson, LLC" may be tokenized into a sequence of tokens "The" "law" "offices" "of" "Smith" "&" "Johnson" "," "LLC". Deterministic finite automata techniques may be used to tokenize law firm names.

optionally, any empty spaces at the left end and the right end of the law firm name may be trimmed. In addition, all the letters in the law firm name may be standardized (e.g., changed to all upper or lower case). Furthermore, tokens may be replaced with their normalized forms based on the component lookup tables.

In step 503, each token is assigned a pair of state and tag designation <state, tag> according to the lookup tables and tag tables by computer system 100 through programming based on SQL tools. In one embodiment, a subset of the tokens in the training data set may be assigned states and tags manually by a user through input device 106, and computer system 100 may automatically assign states and tags to the rest of the tokens. In some cases, as discussed above, one token may have multiple <state, tag> designations.

By performing the above steps, the training data set includes sequences of <state, tag>. The sequences may now be used to generate probability matrices of the hidden Markov model.

In step 504, the number of sequences in the training data set that start with each of the six states is counted by computer system 100, as explained below with respect to FIG. 6.

Figure 6:
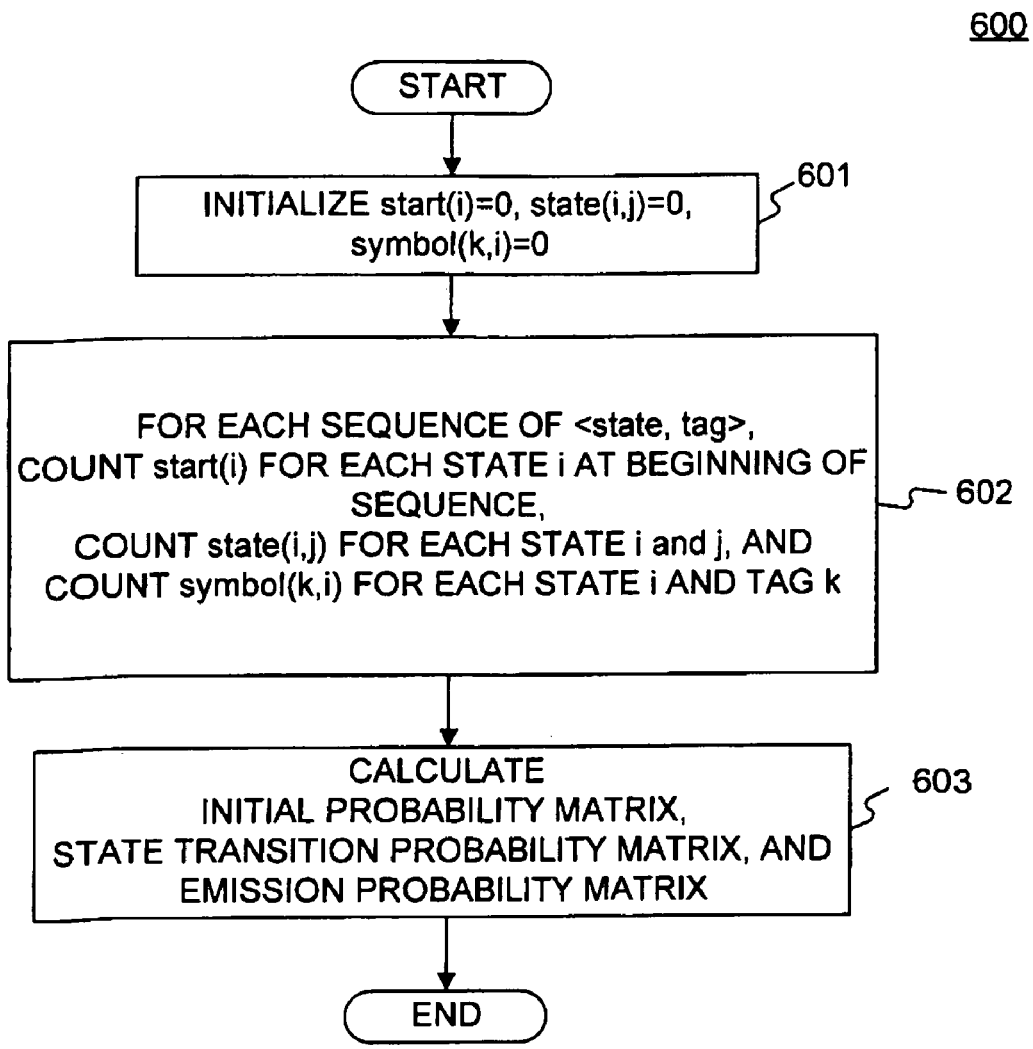
FIG. 6 is a flow chart of an exemplary method for calculating three hidden Markov model probability matrices, consistent with a disclosed embodiment.

FIG. 6 is a flow chart of an exemplary method 600 for calculating the three hidden Markov model probability matrices, consistent with a disclosed embodiment.

In step 601, the following initialization is performed:

For each state i, initialize start(i)=0, for i=1 . . . 6, where start(i) is the number of transitions from start state to state i;

For each transition from state i to state j, initialize state(i, j)=0, for i=1 . . . 6 and j=1 . . . 6, where state(i,j) represents the number of transitions from state i to state j;

For each state i and tag k, initialize symbol(k,i)=0, for i= 1 . . . 6 and k=1 . . . 6, where symbol(k,i) represents the number of tag k on state i;

In step 602, the number of state i at the beginning of a sequence is counted for each sequence, the number of transitions in each sequence from one particular state to another state is counted for each combination of two states, and the number of a particular tag assigned to a particular state in the <state, tag> pair of each sequence is counted for each combination of tag and state pair by computer system 100.

Step 602 may be described as follows:

For each sequence:
    If the sequence starts with state i, then start(i)++;
    If there is a transition from state i to state j, then state(i, j)++,
    If there is tag k on state i, then symbol(k,i)++.

In step 603, the calculated values of start(i), state(i,j), and symbol(k,i) are used by computer 100 to generate an initial probably matrix, a state transition probability matrix, and an emission probability matrix of the hidden Markov model. These matrices may be calculated as follows:

$$\text{Initial Probability Matrix:} \pi_i = \text{start}(i) \Big/ \sum_{i=1}^{6} \text{start}(i)$$

$$\text{State Transition Probability Matrix:} P_{ij} = \text{state}(i, j) \Big/ \sum_{j=1}^{6} \text{state}(i, j)$$

$$\text{Emission Probability Matrix:} b_{ki} = \text{symbol}(k, i) \Big/ \sum_{k=1}^{6} \text{symbol}(k, i)$$

Tables 7-9 below are examples of the probability matrices of the hidden Markov model learned from the training process.

TABLE 7

Initial Probability Matrix.

| | |
|---|---|
| People | 0.622 |
| Initial | 0.008 |
| Organization | 0.321 |
| Specialty | 0.007 |
| Suffix | 0.040 |
| Separator | 0.000 |

TABLE 8

State Transition Probability Matrix.

| | People | Initial | Organization | Specialty | Suffix | Separator |
|---|---|---|---|---|---|---|
| People | 0.4611 | 0.3966 | 0.0929 | 0.0053 | 0.0365 | 0.0076 |
| Initial | 0.9727 | 0.0203 | 0.0034 | 0.0024 | 0.0007 | 0.0004 |
| Organization | 0.0041 | 0.0002 | 0.5355 | 0.0000 | 0.0066 | 0.4535 |
| Specialty | 0.0289 | 0.0000 | 0.5638 | 0.3511 | 0.0182 | 0.0380 |
| Suffix | 0.0059 | 0.0000 | 0.0560 | 0.0058 | 0.8732 | 0.0590 |
| Separator | 0.9111 | 0.0317 | 0.0546 | 0.0023 | 0.0003 | 0.0000 |

TABLE 9

Emission Probability Matrix.

| | PNP | INI | ORG | SPE | SUX | SEP |
|---|---|---|---|---|---|---|
| People | 0.999366 | 0.0 | 1.72901E-4 | 2.88168E-4 | 1.72901E-4 | 0.0 |
| Initial | 0.0 | 1.0 | 0.0 | 0.0 | 0.0 | 0.0 |
| Organization | 0.116878 | 0.0 | 0.6417074 | 0.12385142 | 0.1175627 | 0.0 |
| Specialty | 0.020765 | 0.0 | 0.0928962 | 0.86448087 | 0.0218579 | 0.0 |
| Suffix | 0.027047 | 0.0 | 0.04532164 | 0.028874269 | 0.88121345 | 0.01754386 |
| Separator | 0.0 | 0.0 | 0.0 | 0.0 | 0.17006047 | 0.829939532 |

Similarity Measurement of Names by Dynamically Weighing Components

Next, the normalized forms of law firm names are compared using a comparison function by dynamically weighing components of the names according their presence in the names.

A normalized law firm name can be represented as a four-dimensional vector ($c_1$, $c_2$, $c_3$, $c_4$) in $R^4$ space, where $c_1$ is a root component which may represent People component or a combination of People and Initial components, $c_2$ may represent Specialty component, $c_3$ may represent Organization component, $c_4$ may represent Suffix component, and $c_1$ through $c_4$ may be arranged in order of importance. The Separator component is not included in the normalized law firm name vector. This vector is exemplary only, and thus the vector may be defined to have different number of dimensions, different representations of component types, or different order of importance.

Figure 7:
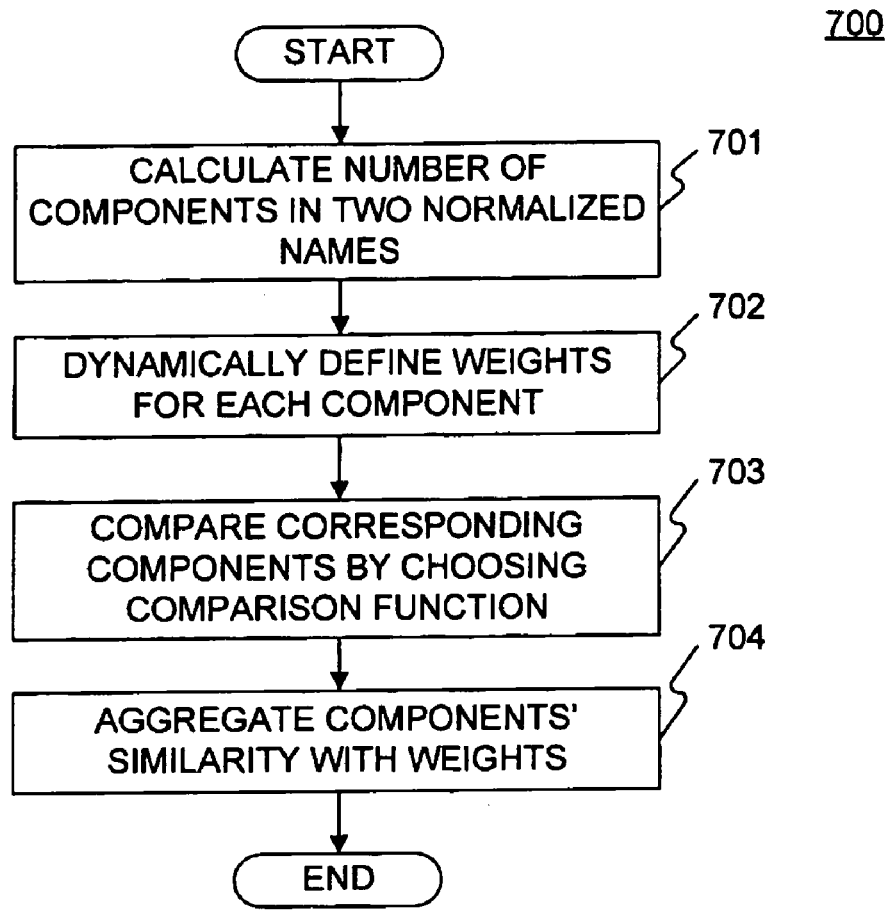
FIG. 7 is a flow chart of an exemplary method for comparing two normalized names, consistent with a disclosed embodiment.

FIG. 7 is a flow chart of an exemplary method 700 for comparing two normalized names, consistent with a disclosed embodiment.

In step 701, the number of different components includes in the two normalized names is calculated. For example, if a first normalized name has People, Organization, and Suffix components, and a second normalized name has People, Specialty, and Suffix components, then the number of different components in the two normalized names is four, i.e., People, Organization, Specialty, and Suffix. Accordingly, vector $f_1$ for the first normalized name may be (People, "", Organization, Suffix) and vector $f_2$ for the second normalized name may be (People, Specialty, "", Suffix).

In the above example, two law firm names $f_1$ and $f_2$ have been normalized for comparison, where $f_1=(x_1, x_2, x_3, x_4)$ and $f_2=(y_1, y_2, y_3, y_4)$. In step 702, weights $w_i$ may be dynamically assigned to the individual components by computer system 100 based on the availability of each component such that $w_i > w_{i+1}$ and $\Sigma w_i = 1$. That is, the sum of all the weights equals 1, but the number of weights depends on the number of components available, as not all law firm names have all of People, Specialty, Organization, and Suffix component types. The weights may be determined based on the importance of each component in comparing similarity of law firm names. For example, when comparing law firm names in various forms for matching or for distinguishing, people names may be more important than the type of organization or specialty.

Below are specific examples of assigning weights depending on the presence and absence of components in names.

If four components ($x_1$, $x_2$, $x_3$, $x_4$) are present in the names, four weights are defined. For example, $w_1=0.4$, $w_2=0.3$, $w_3=0.2$, and $w_4=0.1$ may represent weights for People, Specialty, Organization, and Suffix, respectively. Accordingly, the overall score $f(X)=0.4x_1+0.3x_2+0.2x_3+0.1x_4$.

If three components ($x_1$, $x_2$, $x_3$) are present in the names, three weights may be defined as follows:

If People, Specialty, and Organization are present, then $w_1=4/8$, $w_2=3/8$, and $w_3=1/8$, such that the score $f(X)=4/8*x_1+3/8*x_2+1/8*x_3$.

If Specialty, Organization, and Suffix are present, then $w_1=5/9$, $w_2=3/9$, and $w_3=2/9$, such that the score $f(X)=5/9*x_1+3/9*x_2+2/9*x_3$.

If People, Specialty, and Suffix are present, then $w_1=3/6$, $w_2=2/6$, and $w_3=1/6$, such that the score $f(X)=3/6*x_1+2/6*x_2+1/6*x_3$.

If two components ($x_1$, $x_2$) are present in the names, two weights may be defined as follows:

If People and Specialty are present, then $w_1=0.9$ and $w_2=0.1$, such that the score $f(X)=0.9x_1+0.1x_2$.

If Specialty and Organization are present, then $w_1=2/3$ and $w_2=1/3$, such that the score $f(X)=2/3*x_1+1/3*x_2$.

If People and Suffix are present, then $w_1=3/4$ and $w_2=1/4$, such that the score $f(X)=3/4*x_1+1/4*x_2$.

If only one component is present, then $w_1=1.0$ and score $f(X)=w_1$.

In step 703, corresponding comparison functions are selected for each component. The similarity comparison function similarity($x_i,y_i$) for component i may be based on either string comparison or vector space model, and returns a value between 0 for totally dissimilar and 1 for exactly similar. Different types of similarity comparison functions may be used for different components of the normalized law firm name. For the components with normal forms (e.g., Organization and Suffix components), a comparison has only two results: either 1 for equal value or 0 for different values.

In step 704, the two law firm names may be compared by computer system 100 using a similarity function. The name normalization similarity function may be defined as aggregated similarity of each component with weight $w_i$:

$$Sim(f_1, f_2) = \sum_{i=1}^{j} w_i \cdot similarity(x_i, y_i),$$

where $f_1 = (x_1, x_2, x_3, x_4)$, $f_2 = (y_1, y_2, y_3, y_4)$, $j \leq 4$, $$\sum w_i = 1, \text{ and } w_i > w_{i+1}.$$

The name normalization similarity function $Sim(f_1, f_2)$ may return a value between 0 for totally dissimilar and 1 for exactly similar, because the sum of all the weights equals 1.

Technique for Record Comparison and Numerical Records

Figure 8:
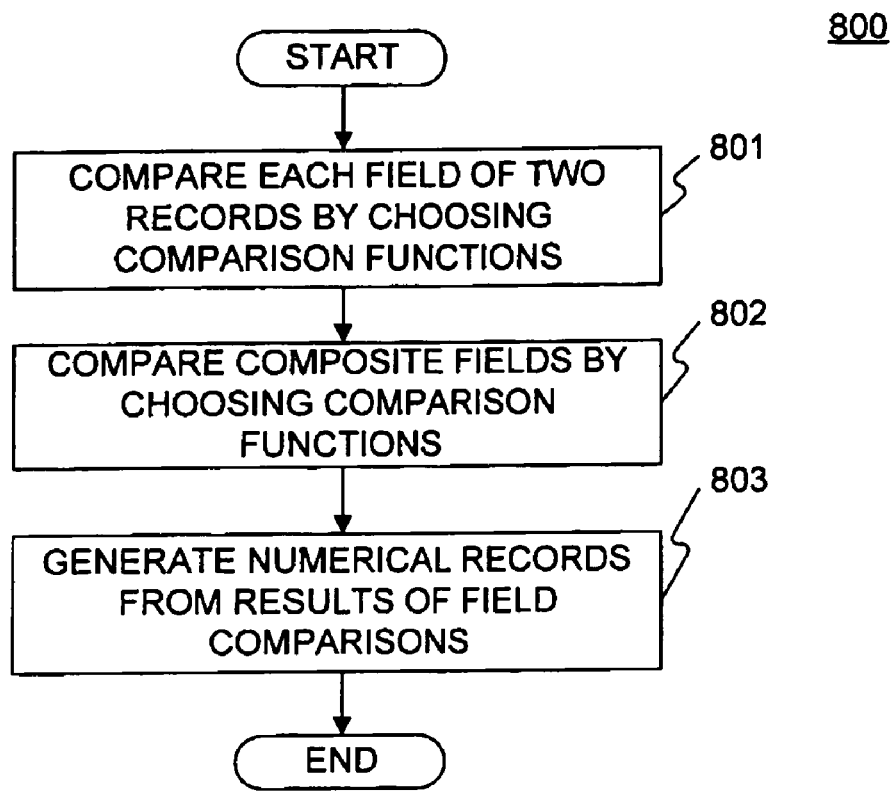
FIG. 8 is a flow chart of an exemplary method for comparing two records and formulating numerical records, consistent with a disclosed embodiment.

FIG. 8 is a flow chart of an exemplary method 800 for comparing two records and formulating numerical records, consistent with a disclosed embodiment. The following exemplary method includes comparing an attorney from a case law document with the attorney in an authority attorney directory database.

A numerical record is the result of comparing a key record with a non-key record. The matching function/classifier is learned based on a data set of numerical records and the matching process applies the matching function to a record pair to decide if the two records are a match.

A key record may be extracted from case law documents. Exemplary key attorney records may be represented by a nine-dimensional vector (aid, first name, middle name, last name, prefix, suffix, law firm, city, state), wherein aid is a unique identifier generated for the extracted attorney but is not used for comparison during record matching. An example of a key attorney record may be: (1036, John, J, Wasson, null, Jr., Wasson & Smith, null, OH). Attorney records may include null values if the attorney information is missing certain fields.

In step 801, numerical records are generated by computer system 100 by comparing the key attorney record with non-key attorney records using comparison functions. The first two fields of a numerical record may be populated by copying the aid and isln identifiers from the key attorney record and the non-key attorney record, respectively, without using any comparison functions. The next eight fields of the numerical record may be the results of comparing the corresponding fields in the key attorney record with the non-key attorney record using comparison functions.

Different types of comparison functions may be used for different fields. For example, first name in the key attorney record may be compared with first name in the non-key attorney record using a string comparison function, and law firm in the key attorney record may be compared with law firm in the non-key attorney record using a name normalization similarity function described above. Furthermore, any field that includes a null value in either the key attorney record or the non-key attorney record is not compared and a value of 0 is included the numerical record for that field. The result is a set of numerical records whose first two fields are identifiers and the rest of the fields are comparison function result values ranging from 0 to 1.

Optionally, in step 802, computer system 100 may add additional fields to the numerical records to provide additional dimensions and to improve record matching. For example, first name, middle name, and last name fields from the key attorney record and from the non-key attorney record may be combined and inputted into a string based comparison function for a result denoted as sfull, and inputted into a vector cosine comparison function for a result denoted as vfull. As yet another example, all the fields (excluding aid) in the key attorney record may be combined and all the fields (excluding isln) in the non-key attorney record may be combined to be inputted into a comparison function for a result denoted as fscore. The results, sfull, vfull, and fscore, may be added to the ends of the numerical records as additional fields to be used for matching. The above additional fields are exemplary only, and other combinations of fields and other various comparison functions could be used to create any number of additional dimensions to the numerical records.

In step 803, comparison results from steps 801 and 802 are used to generate numerical records. In addition, an additional field, class label, is included in the numerical records. The class label is 1 if the two records are a match or 0 if the two records are not a match. A numerical record may be represented by a vector $r=(x_1, x_2, x_3, \ldots, x_{n-1}, x_n)$, where $x_1$ and $x_2$ are aid and isln identifiers from the key record and the non-key record, $x_3$ through $x_{n-1}$ are the results from comparison functions, and the last field $x_n$ is the class label. Initially, the class label is set to 0, and it is updated after going through a matching process.

Figure 9:
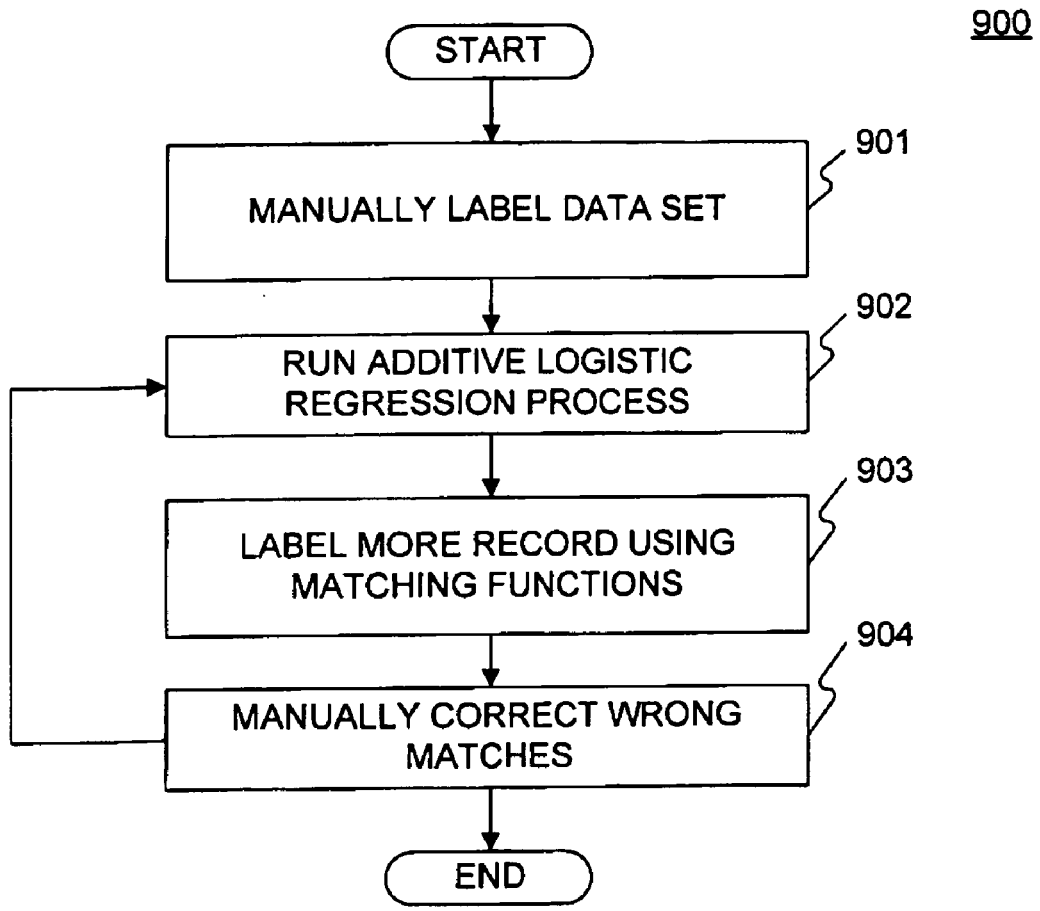
FIG. 9 is a flow chart of an exemplary method for learning a match function, consistent with a disclosed embodiment.

Learn Match Function with Additive Logistic Regression with Support of Human Interaction FIG. 9 is a flow chart of an exemplary method 900 for learning a match function, consistent with a disclosed embodiment.

In step 901, attorney records extracted from case law documents are labeled by manually finding their corresponding matches in the attorney authority directory, pulling the isln, and adding it to the case law records. In one embodiment, the attorney authority database may be queried for each labeled case law record, pulling potential candidate records by an optimized query design method. Then, by using the record comparison method described above, each of the candidates is compared with the case law records to create numerical records. When the isln in a case law record is the same as that in the authority record, the class label is set to 1, otherwise the class label is set to 0. The process resulted in a data set of records with class labels being 0 or 1.

In step 902, computer system 101 fits the numerical data set into a learning algorithm, e.g. an adaptive Newton algorithm for fitting an additive logistic regression model, described as below:

1. Start with weights $w_i=1/n$, $i=1, 2, \ldots, N$, $F(r)=0$, and probability estimates $p(r_i)=1/2$,
2. Repeat for $m=1,2,\ldots, M$:
   a. Compute working responses $$z_i = \frac{y_i^* - p(r_i)}{p(r_i)(1 - p(r_i))}$$

and weights $w_i=p(r_i)(1-p(r_i))$,
   b. Fit the function $f_m(r)$ by a weak learning method of $z_i$ to $r_i$ using weights $w_i$,
   c. Update $F(r) \leftarrow F(r)+1/2 * f_m(r)$ and $$p(r) \leftarrow \frac{e^{F(r)}}{e^{F(r)} + e^{-F(r)}},$$

3. Output the classifier $$\text{sign}[F(r)] = \text{sign}\left[\sum_{m=1}^{M} f_m(r)\right],$$

where r represents a numerical record and n is the number of fields used in the matching process. The identifiers aid and isln do not participate in the learning and matching processes so they are turned off in training and matching processes.

The above algorithm outputs a decision function that helps make match decisions in the matching processes.

In the learning process, three basic learning algorithms are applied: additive logistic regression with base learning method, decision stump, simple linear regression, and general weighted linear regression. The decision stump method may classify according to probability distribution by choosing a single field with minimum entropy conditioned on rows of a contingency table. The simple linear regression may choose the best field that can result in minimum residual loss at each round of the iteration. The general weighted linear regression may choose more than one field in each round of iteration to construct a linear function, which results in minimum residual loss.

Furthermore, a 10-fold cross validation method may be used to evaluate the performance of three learned classifiers. Decision stump and simple linear regression may outperform general weighted linear regression, thus resulting in two matching functions for use in labeling more results in step 903.

In step 903, the two learned classifier from step 902 are used to label more key records with committee voting approach. The process outputs three files: matched file containing record pairs labeled as matched by both classifiers; half-matched file containing record pairs labeled differently by the two classifiers; and non-matched file containing record pairs labeled as non-matched by both classifiers.

In step 904, the results files may be manually evaluated. Because most of the record pairs in the matched file and the non-matched file are correct, the record pairs in the half-matched file are evaluated with more focus.

Through the above-described steps, more case law attorney records are labeled to obtain a larger training data set. The resulting numerical records may be separated into two data sets, one used for training and the other one used for testing. Two classifiers are learned with simple linear regression and decision stump algorithms from a first set of records (training data set) and evaluated with a second set of records (testing data set). Then, their overall accuracy, precision, recall, and matching score were compared. An evaluation showed decision stump is a better base learning method with additive logistic regression. Consequently, the final classifier is built from additive logistic regression with decision stump as the base learning method.

Record Matching

Figure 10:
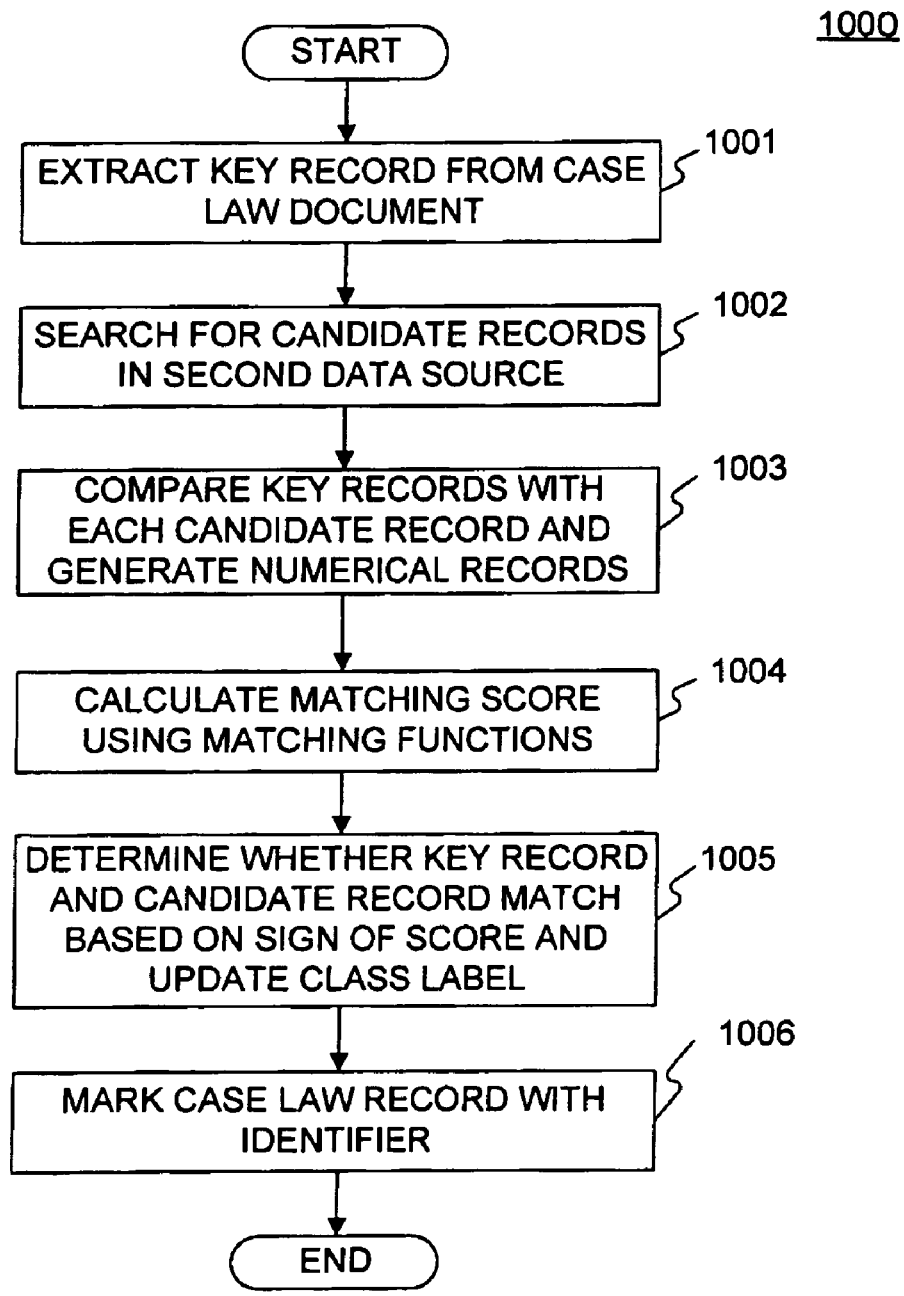
FIG. 10 is a flow chart of an exemplary method for matching records, consistent with a disclosed embodiment.

FIG. 10 is a flow chart of an exemplary method 1000 for matching records, consistent with a disclosed embodiment. The following exemplary method includes matching an attorney from a legal document, such as a case law document, with the attorney in an authority attorney directory database.

In step 1001, attorney information is extracted from a case law document and packaged into a key attorney record by computer system 100. For example, an attorney's name, employer (law firm), address, etc. may be extracted from a case law document in LexisNexis and the extracted information may be packaged into an XML file stored in storage device 105. Computer system 100 may access the case law document stored in a remote server via network interface 103, or the case law document may be received on removable storage 104.

In step 1002, for each key record from the case law document, attorneys are retrieved by computer system 100 from an authority attorney directory based on a rule and packaged into candidate attorney records (non-key records). The authority attorney directory may be stored in computer system 100 in storage device 105 or may be stored in a remote server and accessible via network interface 103. For example, attorneys' names, employers (e.g., law firms), addresses, etc. may be retrieved from LexisNexis's Martindale-Hubbell® authority attorney directory and the extracted information may be packaged into one or more XML files stored in storage device 105. The rule for retrieving candidate attorney records may be based on, for example, comparing last names in the key record and the authority attorney directory using a string comparison function to obtain similarity values, and then comparing the similarity values with a predefined threshold. Alternatively, the rule may be based on comparing both first and last names. Other rules for retrieving candidate attorney records are possible. Exemplary candidate attorney records may be represented by a nine-dimensional vector (isln, first name, middle name, last name, prefix, suffix, law firm, city, state), wherein isln is an International Standard Lawyer Number assigned to and stored with an attorney in the authority attorney directory, but is not used for comparison during record matching. For example, for a key record (1036, John, J. Wasson, null, Jr., Wasson & Smith, null, OH) that is extracted from a case law document, the following four candidate attorney records may be retrieved from the authority attorney directory:

(913082537, John, R, Wasson, null, null, White & Hunt, Seattle, Wash.)

(202714364, John, B, Wasson, null, null, Harry, Owen & Mark LLP, null, CA)
(313082537, John, G, Wasson, null, Sr., Law Office of David, San Diego, Calif.)
(802714197, John, J, Wasson, null, Jr., Wasson & Smith, null, OH).

In step 1003, a key attorney record is compared with candidate records retrieved in step 1002 with the comparison functions selected for each field. In the above example, the below four numerical records result from comparing the key record with four candidate records:

(1036, 913082537, 1.0, 0.0, 1.0, −2.0, −1.0, 0.0, 0.98, 0.67, −2.0, 0.0, 0.34, 0.0)
(1036, 202714364, 1.0, 0.0, 1.0, −2.0, −1.0, 0.25, 0.98, 0.67, −1.0, 1.0, 0.5, 0.0)
(1036, 313082537, 1.0, 0.0, 1.0, −2.0, 0.5, 0.22, 0.99, 0.67, −1.0, 1.0, 0.5, 0.0)
(1036, 802714197, 1.0, 1.0, 1.0, −2.0, −1.0, 0.99, 1.0, 1.0, −1.0, 1.0, 0.9, 0.0).

The last field in the numerical records is the class label, which is initially set to 0.

In step 1004, each numerical record r is fit into decision function $$\text{sign}\left[\sum_{m=1}^{M} f_m(r)\right]$$

that is learned form training data set and $f_m(r)$ is learned at each iteration m of learning process from 1 to M iterations. As each of $f_m(r)$ results in a real value, all the M real values are summed up to result in one real value as a matching score.

In step 1005, a matching record is determined by computer system 100 based on the sign of the matching score. If only one numerical record results in a positive value, then that numerical record decides a match and the other numerical records that results in zero or negative values decide non-matches. If multiple numerical records result in positive values, then the numerical record with the greatest sum value decides a match and the rest of the numerical records decide non-matches. For example, suppose the four numerical records result in the following four matching scores: −1.5, −0.9, −0.33, and 0.1. Then, the numerical record with the positive value of 0.1 represents a match. Accordingly, the class label for the fourth numerical record is updated to 1 as follows: (1036, 802714197, 1.0, 1.0, 1.0, −2.0, −1.0, 0.99, 1.0, 1.0, −1.0, 1.0, 0.9, 1.0). This means that the key attorney record (1036, John, J, Wasson, null, Jr., Wasson & Smith, null, OH) extracted from a case law document has been matched with the candidate attorney record (802714197, John, J, Wasson, null, Jr., Wasson & Smith, null, OH) from the authority attorney directory database.

In step 1006, the case law document is marked with the identifier of the matching candidate attorney record by computer system 100. In one embodiment, where the case law document is stored in a remote server, the computer system 100 communicates the matching candidate attorney record via network interface 105 to the remote server for marking the case law document. For example, the case law document from which (1036, John, J, Wasson, null, Jr., Wasson & Smith, null, OH) was extract may be marked with isln identifier 802714197 of the candidate attorney record that was determined to be the match. Therefore, any user or computer viewing the case law document may easily link and reference the attorney in the authority directory.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method of normalizing strings, comprising:
    tokenizing a string into a sequence of components;
    generating one or more sequences of tags by assigning tags to the components based on lookup tables;
    determining, using a processor, a sequence of states of the components based on the one or more sequences of tags; and
    generating a normalized string by normalizing the sequence of the states.

2. The method of claim 1, further comprising:
    determining a similarity between the normalized string and another normalized string of another string using a similarity function.

3. The method of claim 2, wherein the similarity function applies weights to the components.

4. The method of claim 1, wherein the normalizing comprises:
combining consecutive components with a same state; and
normalizing the components based on the lookup tables including normal forms.

5. The method of claim 1, wherein:
the string is a law firm name; and
the tags and the states include at least one of people, initial, specialty, organization, suffix, and separator.

6. The method of claim 1, wherein determining the sequence of states of the components comprises using a hidden Markov model and a Viterbi algorithm.

7. A system for normalizing strings, comprising:
a processor;
means for tokenizing a string into a sequence of components;
means for generating one or more sequences of tags by assigning tags to the components based on lookup tables;
means for determining a sequence of states of the components based on the one or more sequences of tags; and
means for generating a normalized string by normalizing the sequence of the states.

8. The system of claim 7, further comprising:
means for determining a similarity between the normalized string and another normalized string of another string using a similarity function.

9. The system of claim 8, wherein the similarity function applies weights to the components.

10. The system of claim 7, wherein the means for generating the normalized string comprises:
means for combining consecutive components with a same state; and
means for normalizing the components based on the lookup tables including normal forms.

11. The system of claim 7, wherein:
the string is a law firm name; and
the tags and the states include at least one of people, initial, specialty, organization, suffix, and separator.

12. The system of claim 7, wherein the means for determining the sequence of states of the components comprises means for using a hidden Markov model and a Viterbi algorithm.

13. A computer-readable storage medium including instructions which, when executed by a processor, perform a method of normalizing strings, the method comprising:
tokenizing a string into a sequence of components;
generating one or more sequences of tags by assigning tags to the components based on lookup tables;
determining a sequence of states of the components based on the one or more sequences of tags; and
generating a normalized string by normalizing the sequence of the states.

14. The computer-readable storage medium of claim 13, wherein the method further comprises:
determining a similarity between the normalized string and another normalized string of another string using a similarity function.

15. The computer-readable storage medium of claim 14, wherein the similarity function applies weights to the components.

16. The computer-readable storage medium of claim 13, wherein the normalizing comprises:
combining consecutive components with a same state; and
normalizing the components based on the lookup tables including normal forms.

17. The computer-readable storage medium of claim 13, wherein:
the string is a law firm name; and
the tags and the states include at least one of people, initial, specialty, organization, suffix, and separator.

18. The computer-readable storage medium of claim 13, wherein determining the sequence of states of the components comprises using a hidden Markov model and a Viterbi algorithm.

19. A computer-implemented method of matching records, comprising:
extracting a key record including key fields from a first data source;
retrieving a candidate record including candidate fields from a second data source, the candidate fields corresponding to the key fields;
computing, using a processor, a numerical record including numerical fields by comparing the key fields and the candidate fields using comparison functions, the numerical fields being result values of the comparison functions;
applying matching functions to the numerical fields, the matching functions being determined by an additive logistic regression method; and
determining whether the key record and the candidate record are a match based on a sum of results of the matching functions.

20. The method of claim 19, further comprising adding an additional numerical field to the numerical record by comparing a combination of two or more key fields with a combination of two or more candidate fields using a comparison function.

21. The method of claim 19, wherein the additive logistic regression method includes a plurality of training iterations.

22. The method of claim 21, wherein:
the training iterations produce decision functions; and
the matching function is determined based on the produced decision functions.

23. The method of claim 19, wherein the comparison functions include at least one of string comparison, word vector, and normalized similarity function.

24. The method of claim 19, wherein:
multiple candidate records are retrieved; and
if multiple candidate records are determined as matches, then the candidate record with the greatest sum of the result of the matching functions is determined to be the match.

25. The method of claim 19, wherein:
the key record and the candidate record are attorney records;
the first data source is a case law document; and
the second data source is an authority attorney directory.

26. A system for matching records, comprising:
a processor;
means for extracting a key record including key fields from a first data source;
means for retrieving a candidate record including candidate fields from a second data source, the candidate fields corresponding to the key fields;
means for computing a numerical record including numerical fields by comparing the key fields and the candidate fields using comparison functions, the numerical fields being result values of the comparison functions;
means for applying matching functions to the numerical fields, the matching functions being determined by an additive logistic regression method; and means for determining whether the key record and the candidate record are a match based on a sum of results of the matching functions.

27. The system of claim 26, further comprising means for adding an additional numerical field to the numerical record by comparing a combination of two or more key fields with a combination of two or more candidate fields using a comparison function.

28. The system of claim 26, wherein the additive logistic regression method includes a plurality of training iterations.

29. The system of claim 28, wherein:
the training iterations produce decision functions; and
the matching function is determined based on the produced decision functions.

30. The system of claim 26, wherein the comparison functions include at least one of string comparison, word vector, and normalized similarity function.

31. The system of claim 26, wherein:
the means for retrieving retrieves multiple candidate records; and
if multiple candidate records are determined as matches, then the candidate record with the greatest sum of the result of the matching functions is determined to be the match.

32. The system of claim 26, wherein:
the key record and the candidate record are attorney records;
the first data source is a case law document; and
the second data source is an authority attorney directory.

33. A computer-readable storage medium including instructions which, when executed by a processor, perform a method of matching records, the method comprising:
extracting a key record including key fields from a first data source;
retrieving a candidate record including candidate fields from a second data source, the candidate fields corresponding to the key fields;
computing a numerical record including numerical fields by comparing the key fields and the candidate fields using comparison functions, the numerical fields being result values of the comparison functions;
applying matching functions to the numerical fields, the matching functions being determined by an additive logistic regression method; and
determining whether the key record and the candidate record are a match based on a sum of results of the matching functions.

34. The computer-readable storage medium of claim 33, wherein the additive logistic regression method includes a plurality of training iterations.

35. The computer-readable storage medium of claim 34, wherein the method further comprises adding an additional numerical field to the numerical record by comparing a combination of two or more key fields with a combination of two or more candidate fields using a comparison function.

36. The computer-readable storage medium of claim 34, wherein:
the training iterations produce decision functions; and
the matching function is determined based on the produced decision functions.

37. The computer-readable storage medium of claim 34, wherein the comparison functions include at least one of string comparison, word vector, and normalized similarity function.

38. The computer-readable storage medium of claim 34, wherein:
multiple candidate records are retrieved; and
if multiple candidate records are determined as matches, then the candidate record with the greatest sum of the result of the matching functions is determined to be the match.

39. The computer-readable storage medium of claim 34, wherein:
the key record and the candidate record are attorney records;
the first data source is a case law document; and
the second data source is an authority attorney directory.

40. The method of claim 1, wherein assigning tags to the components based on lookup tables further comprises:
determining that one or more components has not been tagged; and
assigning tags to the one or more untagged components based on a set of rules.

41. The system of claim 7, wherein assigning tags to the components based on lookup tables further comprises:
means for determining that one or more components has not been tagged; and
means for assigning tags to the one or more untagged components based on a set of rules.

42. The computer-readable storage medium of claim 13, wherein assigning tags to the components based on lookup tables further comprises:
determining that one or more components has not been tagged; and
assigning tags to the one or more untagged components based on a set of rules.

* * * * *